F. M. ROSS.
SAFETY STEERING DEVICE.
APPLICATION FILED MAR. 17, 1916.
1,265,522.
Patented May 7, 1918.
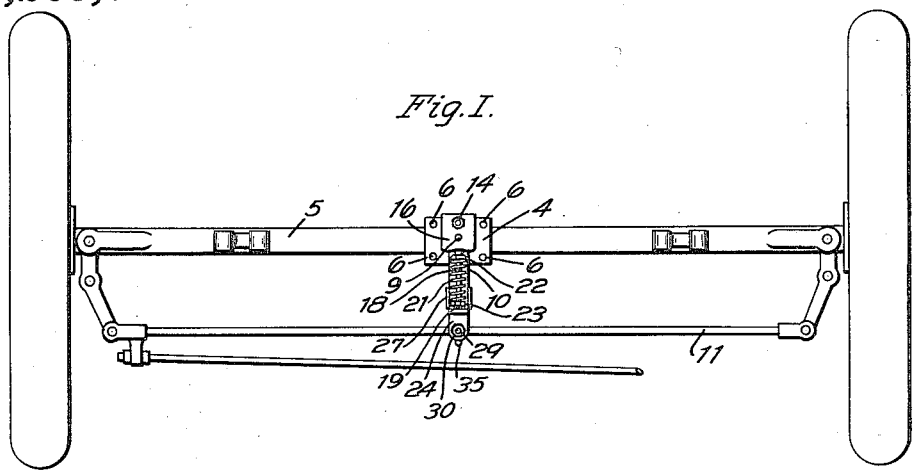
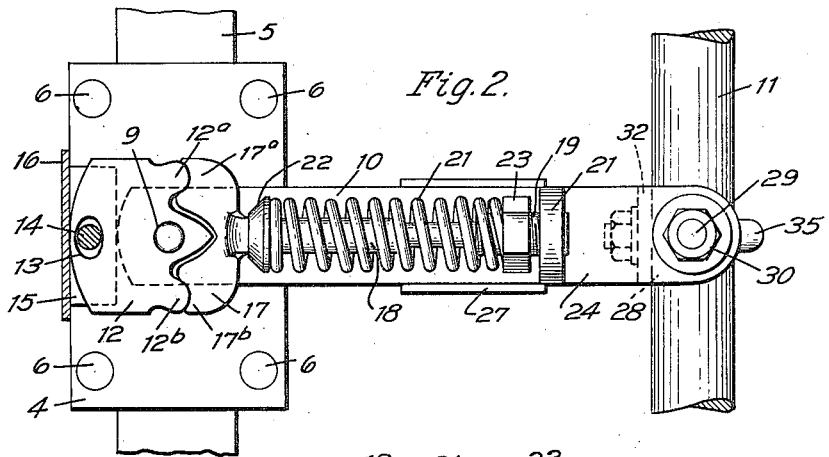
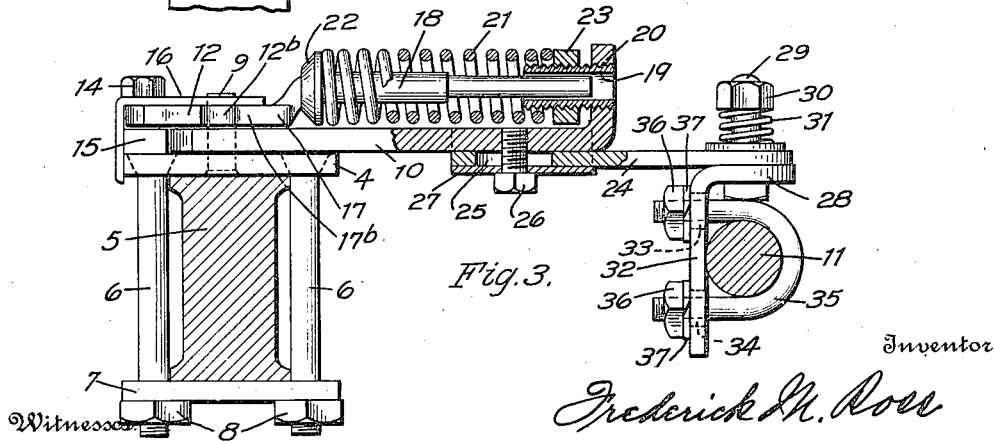
Witnesses
F. E. Arthur
Harry L. Cook
Inventor
Frederick M. Ross
By Walter F. Murray
Attorney

UNITED STATES PATENT OFFICE.

FREDERICK M. ROSS, OF CINCINNATI, OHIO, ASSIGNOR TO THE FREDERICK M. ROSS MANUFACTURING COMPANY, OF CINCINNATI, OHIO, A CORPORATION OF OHIO.

SAFETY STEERING DEVICE.

1,265,522.   Specification of Letters Patent.   Patented May 7, 1918.

Application filed March 17, 1916. Serial No. 84,923.

*To all whom it may concern:*

Be it known that I, FREDERICK M. ROSS, a citizen of the United States of America, and resident of Cincinnati, in the county of Hamilton and State of Ohio, have invented a new and useful Improvement in Safety Steering Devices, of which the following is a specification.

An object of my invention is to produce a safety steering device for automobiles, in which a construction is provided which is simpler than the constructions heretofore employed, and has an increased efficiency, durability and decreased cost of production thereover.

This and other objects are attained in the safety steering device described in the following specification and illustrated in the accompanying drawings, in which:

Figure 1 is a plan view of the front axle, the front road wheels, and a portion of the steering mechanism of an automobile, with a safety steering device embodying my invention mounted in position on the front axle and operatively connected with the steering mechanism.

Fig. 2 is an enlarged plan view of a steering device embodying my invention, certain portions being broken away to more fully disclose the construction thereof, the device being shown attached to sections of a front axle and steering gear reach rod of an automobile.

Fig. 3 is a side elevation of the steering device illustrated in Fig. 2, certain other portions being broken away to more fully disclose the construction thereof.

The improved safety steering device illustrated as an embodiment of my invention consists of a base plate 4 adapted to be secured to the front axle 5 of an automobile, by any suitable fastening means such as bolts 6 located at the corners of the plate and connected at their lower ends by means of bars 7 extending beneath the axle and held in clamping engagement therewith by means of nuts 8 mounted on the bolts. Securely mounted in the plate and extending above its upper face is a pivot pin 9. Upon this pin is journaled an arm 10 which extends toward the rear of the automobile to a position adjacent to the reach rod 11 of the steering gear. Mounted on the pin 9 above the arm 10 is a cam plate 12, the forward end of the plate being provided with a slot 13 with which a bolt 14 which extends into screw threads formed in the plate 4, registers. Beneath the cam plate 12 and in front of the front end of the arm 10 is located a block 15 provided with an aperture which also registers with the bolt 14. This block is merely provided to afford a support for the front portion of the cam plate 12 and is preferably slightly thicker than the arm 10 so that when the bolt 14 is brought into clamping engagement with the plate 12, the plate will be held against movement and yet permit of free movement of the arm 10 about the pivot pin 9. Between the cam plate 12 and the head of the bolt 14 I preferably provide a retaining plate 16 which has an aperture registering with the pin 9 and which bears upon the cam plate and extends beyond its rear edge to prevent displacement of a coöperating cam 17 which engages the cam shaped rear edge of the cam plate 12. The cam 17 is provided with a rearwardly extending shank 18 which passes loosely into a screw threaded sleeve 19 mounted in the upturned end 20 of the arm 10. In order to maintain the cam in engagement with the cam plate 12 I provide a coil spring 21 which bears at its forward end against a collar 22 mounted on the shank 18, and at its rear end against an adjustment nut 23 mounted on the screw threaded exterior of the sleeve 19. The purpose of the adjustment nut 23 is to regulate the tension of the spring 21 and consequently to regulate the pressure of the cam 17 against the cam plate 12. The arm 10 is provided with an extension 24 having a slot 25 formed in its forward end, in which a bolt 26 is located, the bolt being secured in a screw threaded aperture in the arm 10. Beneath the extension 24 and extending upwardly into engagement with opposite sides of the arm 10 is a plate 27, the purpose of this plate being to prevent rotative movement of the extension 24 about the bolt 26 and to hold the arm and extension rigidly in their adjusted positions when the bolt is brought into clamping engagement with the plate. At the rear end of the extension 24 an angle iron 28 is pivotally mounted by means of a bolt 29 located in an aperture formed at the rear end of the extension. Upon this bolt an adjustment nut 30 is provided, a spring 31 being located between the nut and the extension 24 for the purpose of affording yielding connection between the angle iron and the extension. In order to connect the angle iron with the reach rod 11 the downwardly extending portion 32 thereof is provided with apertures 33 and 34 in which are mounted the screw threaded ends of a U-shaped clamping bolt 35 which embraces the reach rod 11. Nuts 36 and washers 37 mounted on the screw threaded ends thereof afford means for clamping the angle iron to the reach rod.

After the device is attached to the front axle of the vehicle, the bolts 14 and 26 are slightly loosened and the extension 24 is brought to a point in which the bolt 29 lies in axial alinement with the center of the reach rod 11. The U-shaped bolt 35 is then passed over the rod and the washer and nuts 37 and 36 placed in position. The front wheels of the vehicle are then alined to have an accurate straight ahead position, their plane of rotation being at right angles to the longitudinal axis of the axle when viewed, as shown in Fig. 1. With the road wheels in this position the arm 10 and extension 24 are adjusted to right angle positions with relation to the axle and the reach rod. Nuts 36 are then tightened to clamp the angle iron and reach rod together and bolt 26 is tightened to prevent movement of extension 24 and arm 10 with relation to one another. Then without changing the position of the road wheels, the bolt 14 is tightened, the cam plate 12 having adjusted itself to such a position as to have its portions 12$^a$ and 12$^b$ bear equally upon the portions 17$^a$ and 17$^b$ of the cam 17. With the plates thus adjusted and secured in their positions the device operates as follows;

Normally the tendency of the coil spring to expand, retains portions 12$^a$ and 17$^a$, and 12$^b$ and 17$^b$ in engagement with one another so that the road wheels are held in their straight ahead positions. However, when the steering gear is operated to direct the vehicle to the left, portions 12$^b$ and 17$^b$ are separated while portions 12$^a$ and 17$^a$ are moved in cam-like eccentric movement over one another, the spring being compressed slightly during this movement and thus tending to cause the parts of the safety steering device and its connected vehicle elements to return to their normal positions. Should the steering gear become damaged or disarranged in any manner while the wheels are so directed, the safety steering device will immediately operate to return the parts to the position shown in Fig. 1. This would occur should the parts be moved to the right and become similarly disarranged, the portions 12$^b$ and 17$^b$ being brought into engagement during this opposite movement of the steering gear while the portions 12$^a$ and 17$^a$ are separated. Should it be desired to vary the pressure which the spring exerts upon the portions of the vehicle in its effort to return them to their normal positions, the adjustment nut 23 may be moved backward or forward on the screw threaded sleeve 19. If at any time the wheels become disalined with the axle so that they do not normally position themselves in their straight ahead positions as shown in Fig. 1, the bolt 14 may be loosened and with the wheels properly positioned, the cam plate 12 permitted to assume its correct position as shown in Fig. 2, the slot 13 permitting of such adjusting movement of the plate. The bolt 14 is then tightened and the device once more placed in its normal operative condition.

Having thus described my invention, what I claim is;

1. In combination in a safety steering device for automobiles, a pivot pin secured to a relatively fixed portion of an automobile, a stationary cam mounted on the pivot pin and adapted to have cam-adjusting movement about the pivot pin, means for securing the cam in adjusted positions upon the pivot pin, an arm pivotally mounted at one end on the pivot pin and having its opposite end arranged for attachment to a relatively movable member of the steering gear of an automobile, a movable cam adapted to engage the stationary cam and reciprocally mounted on the arm, a spring mounted on the arm and normally urging the movable cam into engagement with the stationary cam, an adjustment means mounted on the arm and adapted to change the tension of the spring, and means for connecting the arm with the steering mechanism.

2. In a safety steering device for automobiles, the combination of a stationary cam adapted to be adjustably secured to a relatively fixed portion of an automobile, a movable cam having a shank extending therefrom, said cam being located adjacent to the stationary cam, an arm pivotally mounted adjacent to the stationary cam and having its outer end turned at right angles to the shank of the movable cam, a screw threaded sleeve mounted in the end of the arm and adapted to receive the shank, a spring located between the end of the arm and the movable cam, adapted to force the movable cam into yielding engagement with the stationary cam, an adjustment nut mounted on the screw threaded sleeve and adapted to vary the tension of the spring, and means for connecting the arm with the steering mechanism.

In testimony whereof, I have hereunto subscribed my name this 16th day of March, 1916.

FREDERICK M. ROSS.

Witnesses:
WALTER F. MURRAY,
W. THORNTON BOGERT.